United States Patent [19]

Schulze

[11] 4,375,341
[45] Mar. 1, 1983

[54] DRILLING ALIGNMENT TOOL

[76] Inventor: Herbert C. Schulze, P.O. Box 6070, Incline Village, Nev. 89450

[21] Appl. No.: 921,946

[22] Filed: Jul. 5, 1978

[51] Int. Cl.³ .............................................. B23B 40/00
[52] U.S. Cl. .................................... 408/72 R; 408/97; 408/111
[58] Field of Search ...................... 408/72, 112, 115 R, 408/97, 241 G, 710, 67, 84

[56] References Cited

U.S. PATENT DOCUMENTS

| | | | |
|---|---|---|---|
| 100,772 | 3/1870 | Kelly | 408/112 X |
| 757,950 | 4/1904 | McElwain et al. | 408/112 X |
| 1,212,634 | 1/1917 | Hathaway | 408/112 X |
| 2,671,667 | 3/1954 | Flory | 408/112 X |
| 2,784,616 | 3/1957 | Quackenbush | 408/112 |
| 3,060,772 | 10/1962 | Crump | 408/112 |
| 3,083,593 | 4/1963 | Cotter | 408/115 X |
| 3,146,675 | 9/1964 | Anderson | 408/115 X |
| 3,320,832 | 5/1967 | Jensen | 408/112 |
| 3,620,636 | 11/1971 | Godard | 408/84 |
| 3,907,452 | 9/1975 | Tripp | 408/111 X |

FOREIGN PATENT DOCUMENTS 2,317,779 10/1974 Fed. Rep. of Germany ...... 408/710

OTHER PUBLICATIONS

"Safety Devices", p. 134, American Machinist, May 10, 1945.

Primary Examiner—William R. Briggs

[57] ABSTRACT

This is an attachment for electric drills by which accurate alignment for drilling may be achieved without the necessity of complicated preliminary steps. The invention comprises an elongated extension rod mounted in a particularly constructed handle which is slideable with relation to the rod and which handle has an extension through which the drill can be observed, which extension has a particular end configuration making it suitable to drill straight and accurate holes into virtually any configuration of surface and at a distance from the drill without the necessity of complicated measuring, marking and preliminary steps.

2 Claims, 6 Drawing Figures

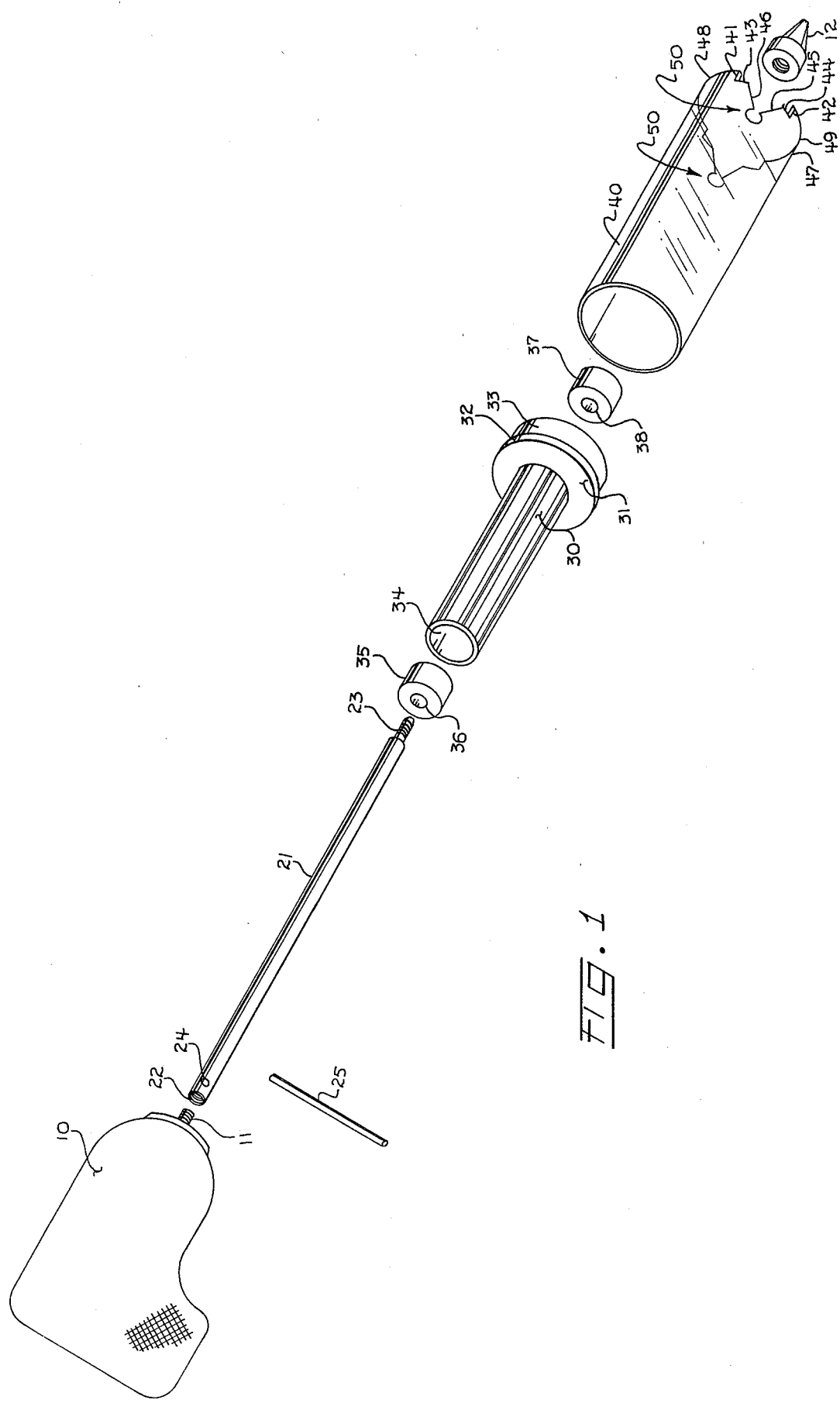

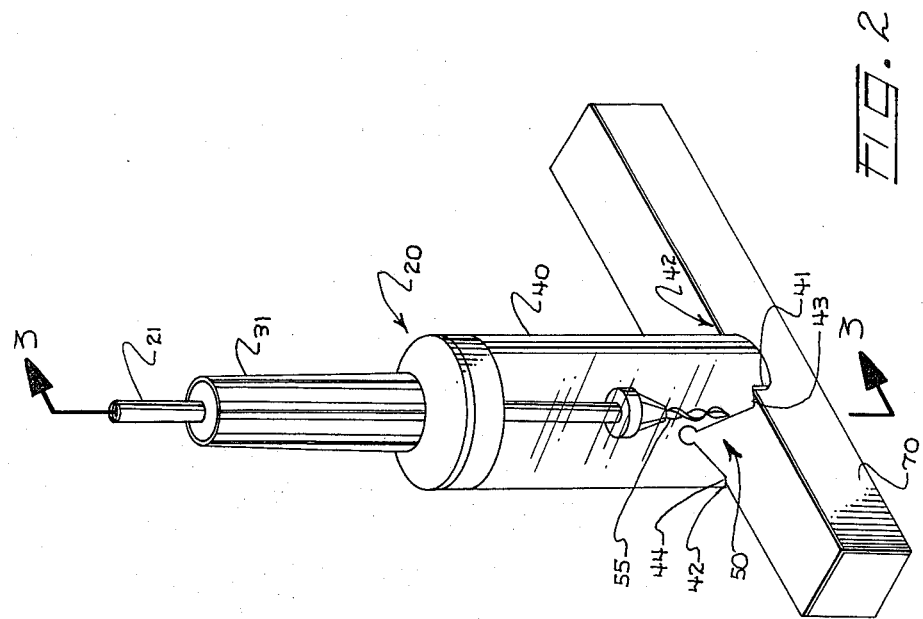
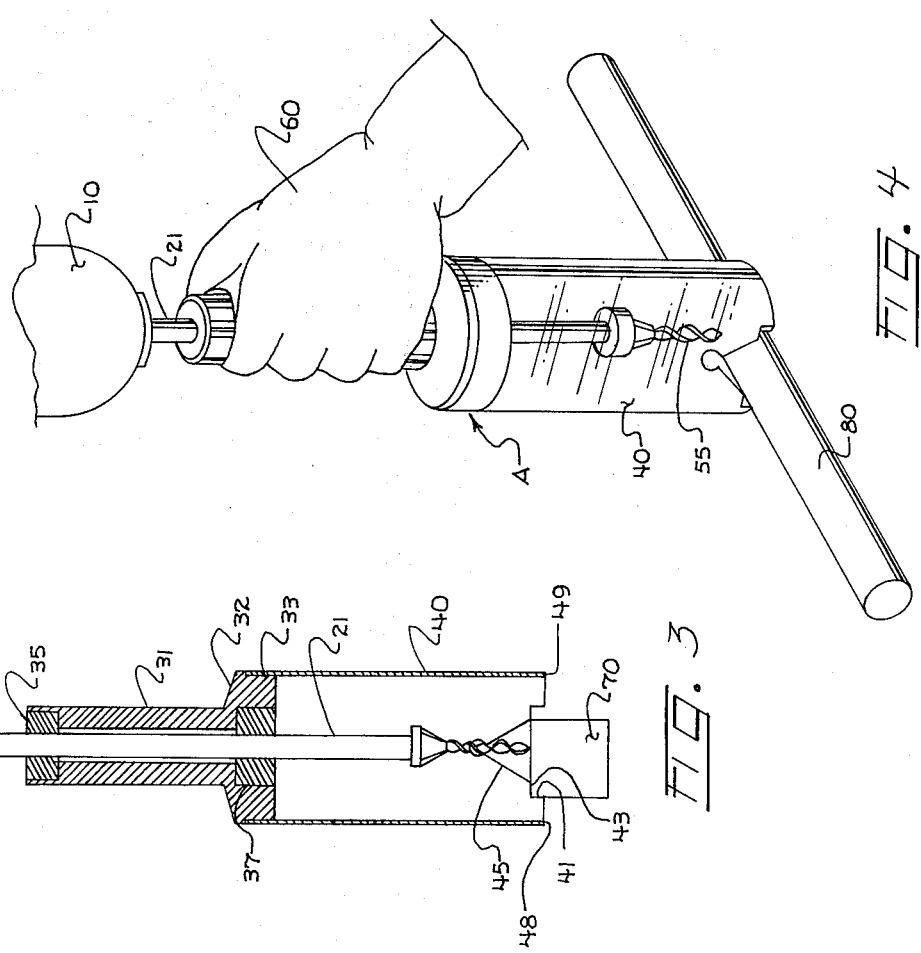

DRILLING ALIGNMENT TOOL

CROSS REFERENCE TO RELATED PATENT APPLICATIONS

This application is related to my design patent application for DRILLING ALIGNMENT TOOL being filed concurrently herewith.

BACKGROUND OF THE INVENTION

1. Field of the Invention

This invention is in the general field of drills and drilling of materials, especially power operated drills. The invention is more particularly directed to an attachment for the drill wherein alignment for drilling on difficult surfaces is automatically achieved and drilling may take place without the customary preliminary steps normally used, resulting in economy of time and the ability to drill upon some surfaces which would otherwise be impossible except by transporting to a well-equipped drill press.

2. Description of the Prior Art

There are many drill guides of one type or another which have been devised in the past. Some of these are very effective for certain limited purposes. Examples of such drill guides may be found in the following U.S. Pat. Nos.

3,907,452; 2,483,060; 3,086,408; 3,864,053; 3,661,469; 3,464,295; 3,381,551; 521,206; and 100,772.

The present invention is unique as compared to the other inventions and prior art in that a handle arrangement is provided which has an extension of transparent material which encompasses and covers the area which is being drilled. This transparent portion has a very particularly designed end which enables one to drill upon unusually shaped surfaces with accuracy and to make square alignments to center lines, and the like, and to make radial drilling possible. In this respect it is unique in its combination of features as compared to all of the prior art.

SUMMARY OF THE INVENTION

I am familiar with, and have studied, many problems existing in the art of drilling materials with hand drills, particularly electric or pneumatic drills.

Several problems exist with relation to ordinary drilling with hand drills. One of such problems is found in overhead drilling, particularly in soft materials, but also in all materials, wherein the drilling debris falls downward upon the party drilling and upon the surrounding area. Also, most unusual configurations are virtually impossible to drill without time consuming pre-preparation such as center punching and aligning and the like. This applies particularly to round objects, concave or convex objects, angularly shaped objects, and the like.

I am very familiar with U.S. Pat. No. 3,907,452 which is now assigned to GBOF, Inc., and to which the present application is being assigned concurrent with the execution thereof. That particular drill, as represented by the aforementioned patent, is a very superb drilling aid. However, as is true with every product, it has certain limitations. In the case of that particular item, one of the limitations is a problem of finding the square center of the edge of a piece of wood or metal, or the like. Another problem is that the shaft cannot readily be removed from the device for utilization as an extension. Still another limitation is that some complex attachments are required to achieve the same results achieved with the present invention on certain types of operations.

In connection with my study, I have found that by a simple addition of a very simple handle device this particular drill guide may be used for hand drilling where desired and may also be used for tapping.

I have accomplished all of the foregoing by providing a suitable handle with bearings, through which an extension rod is inserted, which rod has a threaded end suitable to engage the threaded socket found on most commercial drills when the chuck is removed, and another threaded socket end suitable to hold the chuck removed from the drill. Further I have placed a hole in the end of the shaft adjacent the drill end to which a cooperative handle may be inserted, and by means of which I can use this device as a tapping aid or as a hand drilling aid.

I have also configured the end of a transparent member in such manner that it can be used for automatically finding the center of the thickness of the edge of a piece of material, and wherein further configuration makes it possible to establish proper contact with a variety of surface configurations of the material being drilled.

It is an object of this invention to provide a drill and tapping guide as heretofore outlined wherein the guide may be used either in conjunction with a power operated drill, or as a hand operated drill.

Another object of this invention is to provide a device as mentioned wherein the center of the edge of a sheet of material may be automatically located and drilled.

Another object of this invention is to provide a device as described wherein oddly configured surfaces and normally configured surfaces of a wide variety may be drilled in place, accurately, with no other special preparation.

The foregoing and other objects and advantages of this invention will become apparent to those skilled in the art upon reading a description of a preferred embodiment, which follows, in conjunction with a review of the appended drawings.

BRIEF DESCRIPTION OF THE DRAWINGS

FIG. 1 is an exploded view of a preferred embodiment of the drilling alignment tool of this invention;

FIG. 2 illustrates the embodiment of FIG. 1, symboled, and in use with the drill however removed;

FIG. 3 is a partial section on 3—3 of FIG. 2;

FIG. 4 is a view of the same situation as FIG. 2, but with a users hand shown in position and a portion of a drill attached;

DESCRIPTION OF A PREFERRED EMBODIMENT

Figure 6:
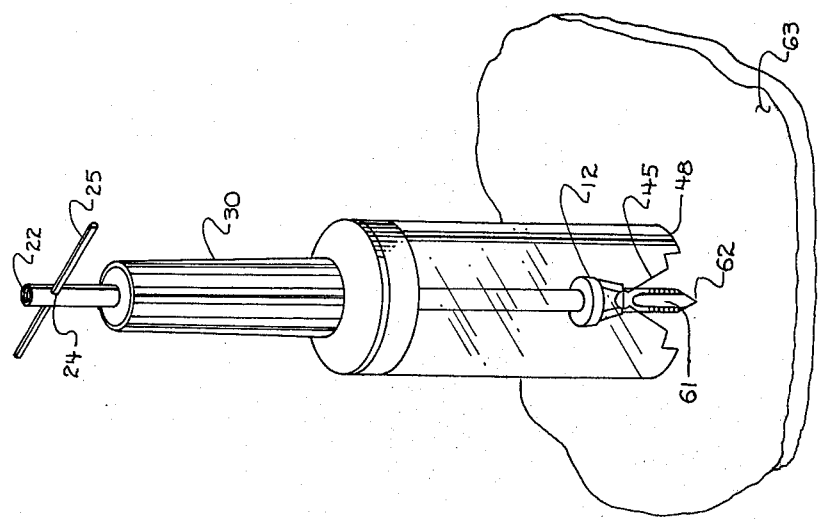
FIG. 6 is a perspective of the apparatus of FIG. 1, assembled and being used for tapping.

FIG. 1 illustrates clearly the individual components making up the apparatus of this invention. A power drill or the like 10 is not a part of this invention, but is utilized with the other elements of the invention. The power drill has a threaded stud 11 to which a chuck 12 is normally attached. The chuck 12 in this instance is shown removed, since the elements of the invention in an exploded view are shown in the manner in which they are assembled for use including the cooperative relationship with the drill.

The drilling alignment tool of this invention comprises a shaft 21 having a threaded end at 23 and a threaded socket end 22. A hole 24 is provided adjacent the socket end of the shaft 21 which hole accommodates rod 25.

The hole 22 is threaded, normally with a ⅜ inch thread, or such other thread as will accommodate and cooperate with the stud 11 on drill 10. The threaded end 23 will have a thread identical to the stud 11 so that the chuck 12 may be threaded onto the end 23 as it was previously on the end 11 before removed for use in this operation.

Two bearings which can be nylon bushings or other suitable bearings 35 and 37 are provided having interior bearing surfaces 36 and 38 suitable to accommodate the shaft 21. The two bearings 35 and 37 are inserted in the hollow interior 34 of the handle 30. These bearings may be held in position by friction or by appropriate adhesive or the like. There is an enlarged flange 32 tapering to a connection through the element 31 with handle 30. A reduced diameter shoulder 33 is also provided.

Figure 5:
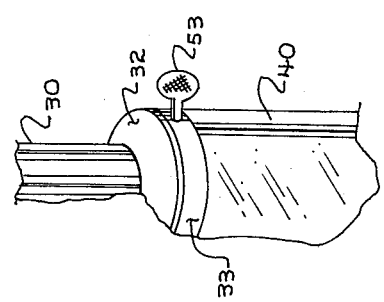
FIG. 5 is a partially broken away view of an alternate apparatus to attach to the area of Figure A on FIG. 4.

An end extension 40, preferable of transparent material such as polycarbonate or the like 40 is provided. This tubular member has an interior diameter suitable to slip over the shoulder 33 in close fit therewith. It may be held thereon by a friction fit, or by adhesive, or by appropriate thumb screws or the like as is shown in FIG. 5.

When the entire device is assembled, the shaft 21 is screwed onto the stud 11, inserted through the bearings 35 and 37 which are in place in the handle 30, and the tubular member 40 is in place upon the shoulder 33.

It will be observed that the tubular member 40 has been provided with a unique end opening on each side. The result of the cutout as indicated is that there are two arcuate portions 48 and 49 of the tubular member 40 the edges of which are perpendicular to the axis of the tubular member 40. Also, two peculiarly shaped areas have been cut out. These areas are designated 50 and there is one on each side of the lower edge of the tubular portion. The configuration includes a pair of shoulders 41 and 42 with perpendicular shoulders 43 and 44, and angular shoulders 45 and 46 terminating in a circular opening 47.

With FIG. 2, particularly in mine, the use of the shoulder portions 41 and 42 and 43 and 44 will become clear. The two pairs of shoulders 43 and 44 will rest upon the surface of work piece 70 thus providing perpendicular alignment for the drill 55. By twisting the entire element so that the two shoulders 42 are in contact with the vertical edges of the work piece 70, the drill 55 will be in the exact center of the work piece 70 on the side upon which it is being worked.

FIG. 3 is a partial section on 3—3 of FIG. 2 and illustrates further the manner in which this device is utilized.

The elements have already been described and will be understood.

In FIG. 4 another unique use for this device is shown wherein a round object such as a pipe or a rod 80 is being drilled without the necessity of center punching or other preliminary drilling or the like. The two pairs of edges 44 and 45 rest upon the curved surface of the object 80 and provide perfect radial alignment for the drill 55 with respect to the round object 80.

FIG. 5 is an alternate construction for the area A on FIG. 4 illustrating that the sleeve 40 may be held in position, against the shoulder 33, if desired, by drilling a hole or a series of holes 54 and threading them and inserting a thumb screw 53 or a series of such thumb screws. In this manner, the sleeve is removable. Alternately, it may be cemented permanently against the shoulder.

There is no illustration, but it will be clear to those skilled in the art by reference to FIG. 1 particularly, that if the chuck 12 is fastened to the end of the rod 23 and the other end 22 is fastened to the drill, that the rod 21 becomes an extension for a drill provided it is not inserted into the balance of the tool members. This adds another feature unusual and different from any of the prior art.

FIG. 6 shows a particularly interesting adaptation wherein the device is not attached to a drill, but the rod 25 has been inserted into the hole 24. In this case a surface 63 having a hole 62 is being tapped by tap 61 held by chuck 12 in the device. In this manner, a hole may be tapped and one can be certain that the tap will be going in perpendicular to the working surface of the work piece 63.

The use of the handle 25 is not necessarily limited, however, to tapping. It is to be noted that this could be utilized for delicate drilling operations, or reaming operations wherein the device is desired to be operated by hand rather than a power device.

Although not illustrated, it will become apparent to those skilled in the art that if one looks at FIGS. 2 and 4 up side down, that this device can be used to drill overhead and in that case the tubular member 40 will protect the user from having chips or the like fall upon him.

While the embodiment of this invention shown and described is fully capable of achieving the objects and advantages desired it is to be understood that such embodiments have been shown for purposes of illustration only and not for purposes of limitation.

I claim:

1. A removable drilling and tapping centering tool for use with a drill having a drive shaft with a chuck and a bit mounted in the chuck, including:
   (a) a tubular handle grip having upper and lower portions and a grip surface;
   (b) a drive shaft bearing sleeve associated with said upper portion for supporting said drive shaft;
   (c) a drive shaft bearing sleeve associated with said lower portion for supporting said drive shaft;
   (d) said bearing sleeves being spaced from each other and axially aligned on the longitudinal axis of said tubular handle grip;
   (e) said lower portion of said handle grip adjacent said lower bearing sleeve including an outwardly extending member projecting radially beyond said grip surface a substantial distance and having an outer periphery;
   (f) a downwardly projecting thin walled alignment sleeve for encompassing said chuck connected and adjacent said outer periphery and extending downwardly a substantial distance therefrom and having a bottom edge portion;
   (g) said alignment sleeve having work engaging means in said bottom edge portion having diametrically opposed substantially similar work receiving means;

(h) said alignment sleeve having its longitudinal axis coaxial with said handle grip longitudinal axis;
(i) said bearing sleeves having means for slideably moving said drive shaft on said handle grip longitudinal axis;
(j) the internal diameter of said alignment sleeve being substantially greater than the external diameter of said tubular handle grip for shrouding said chuck while maintaining said chuck in a spaced relationship with the thin wall of said alignment sleeve, and;
(k) said diametrically opposed work receiving means including means adapted for receiving various sizes of curved surface work pieces as well as various sizes of flat surface work pieces, and wherein said diametrically opposed work receiving means each include a first pair of substantially horizontal flat cooperating work positioning shoulders for receiving various sizes of flat surface work pieces and a second pair of angularly converging cooperating work positioning shoulders for receiving various sizes of curved surface work pieces.

2. A removable drilling and centering tool as in claim 1 and wherein:
(a) said first pair of shoulders are positioned below said second pair of shoulders.

* * * * *